United States Patent [19]

Kimura

[11] 4,393,418
[45] Jul. 12, 1983

[54] TIME BASE ERROR CORRECTION SYSTEM

[75] Inventor: Kenji Kimura, Hachioji, Japan

[73] Assignee: Olympus Optical Company Limited, Tokyo, Japan

[21] Appl. No.: 196,352

[22] Filed: Oct. 14, 1980

[51] Int. Cl.³ .............................................. H04N 5/795
[52] U.S. Cl. ........................................ 360/22; 360/32; 360/36.1; 360/37.1
[58] Field of Search ...................... 360/22, 23, 32, 36, 360/37, 33.1, 36.1, 37.1, 26, 27

[56] References Cited

U.S. PATENT DOCUMENTS

| | | | |
|---|---|---|---|
| Re. 25,809 | 6/1965 | Johnson | 360/26 |
| 3,746,781 | 7/1973 | Nakayama | 360/22 |
| 3,758,710 | 9/1973 | Crosno | 360/36 |
| 4,048,658 | 9/1977 | Nakagawa | 360/22 |
| 4,312,019 | 1/1982 | Kimura | 360/22 |

*Primary Examiner*—Raymond F. Cardillo, Jr.
*Attorney, Agent, or Firm*—Toren, McGeady and Stanger

[57] ABSTRACT

A system for recording and reproducing a video signal, includes a converter for converting an incoming video signal into a number of signal channels, and a corresponding number of magnetic heads for recording and reproducing the signal channels in association with a magnetic tape. A circuit superimposes a pulse signal in the vicinity of the back porch of the incoming video signal prior to its conversion, and reconverting circuitry operates to reconvert the signal channels and combine them to provide a reproduced video signal. The superimposed pulse is separated from the reproduced video signal by appropriate circuitry, and the relative phase fluctuation between the separated pulse and a horizontal synchronizing signal to be added to the reproduced video signal is detected. Additional circuitry serves to control the phase of the horizontal synchronizing signal in accordance with the detected relative phase fluctuation, and to add the horizontal sychronizing signal to the reproduced video signal to provide a video signal output.

2 Claims, 9 Drawing Figures

TIME BASE ERROR CORRECTION SYSTEM

BACKGROUND OF THE INVENTION

The present invention relates to a picture recording and reproducing device in which an incoming video signal is converted into a plurality of signal channels by means such as Hadamard conversion, time division or the like, with the use of a multichannel heads.

A recording and reproducing device for recording and reproducing a video signal by dividing it into a plurality of signal channel each subjected to band limitation, by means such as Hadamard conversion or time division, and by recording and reproducing such a band divided converted signal is well known.

However, in such a device during recording and reproducing, there is a problem of mixing a jitter or drift component caused by running unevenness of the recording medium, for example a magnetic tape, into the reproduced signal.

Until now, in order to solve this problem, use was made of a time base correction circuit in each channel, and the jitter or drift compornent during reproduction was removed.

However, time base correction cannot completely absorb the jitter or drift component due to factors such as noise included in the reproduced signal, and residual jitter usually remains. This residual jitter finally appears as a picture flare in the reproduction monitor (television receiver) so that the quality of the reproduced picture is considerably deteriorated.

SUMMARY OF THE INVENTION

It is an object of the present invention to eliminate the above mentioned disadvantages.

It is another object of the present invention to provide a picture recording and reproducing device which can prevent any picture flare in the reproduced picture even if residual jitter exists, and to improve the picture quality.

According to the present invention, a picture recording and reproducing device in which an incoming video signal is converted into a plurality of signal channels with the use of a plurality of magnetic heads, comprises first means for superimposing a pulse-like signal on the video signal at the vicinity of the back porch at the recording side, second means for separating the pulse-like signal from the video signal at the reproducing side, third means for detecting relative phase fluctuation between the separated pulse signal and a horizontal synchronizing signal which is added to the video signal at the reproducing side, and fourth means for phase-controlling said horizontal synchronizing signal by the output of the third means, and adding the synchronizing signal to said video signal at the reproducing side. The phase fluctuation output of said third means is supplied to the fourth means through a low pass filter.

DESCRIPTION OF THE PREFERRED EMBODIMENT

Figure 1:
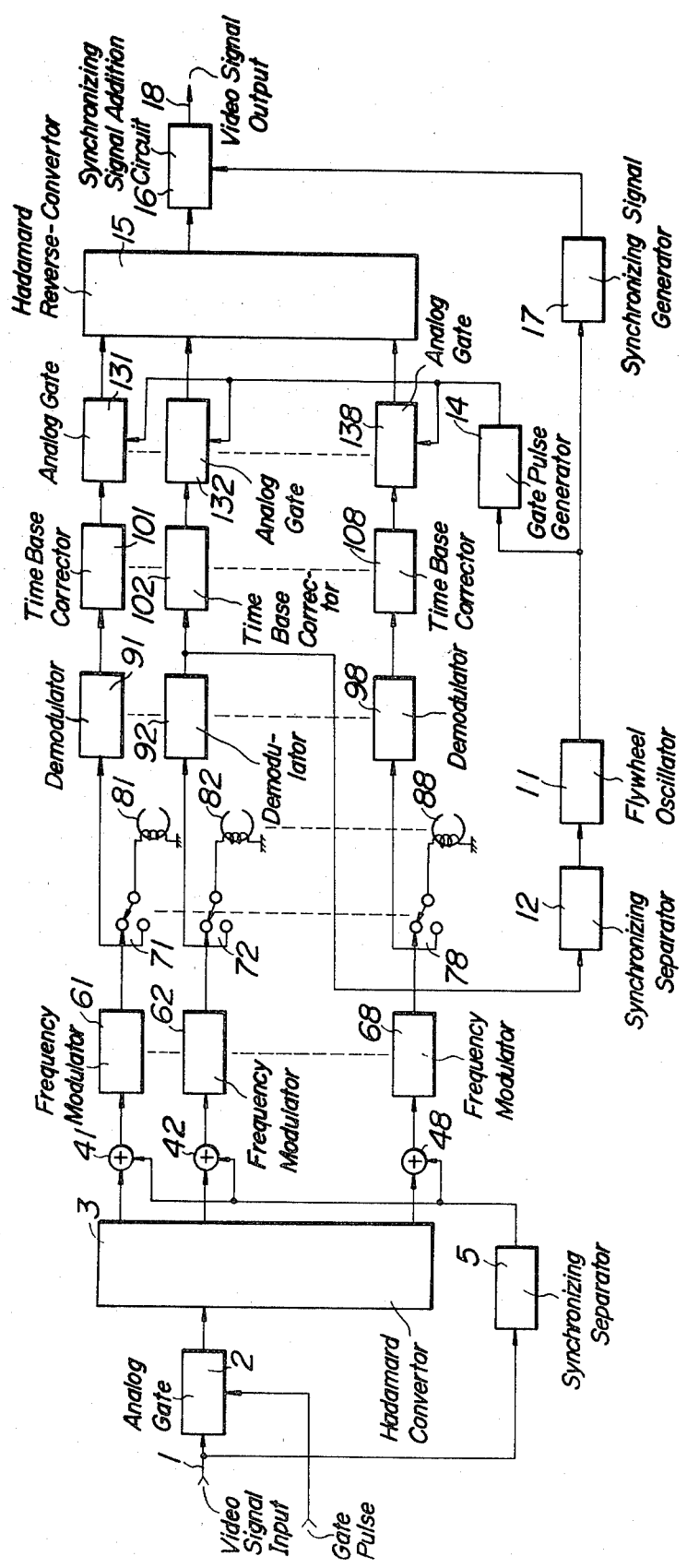
FIGS. 1 to 3 are block diagrams showing one embodiment of a picture recording and reproducing device according to the present invention.

Referring now to the drawings, wherein same reference characters designate same or corresponding parts throughout the several views, one embodiment of a picture recording and reproducing device according to the present invention will be explained.

Figure 4:
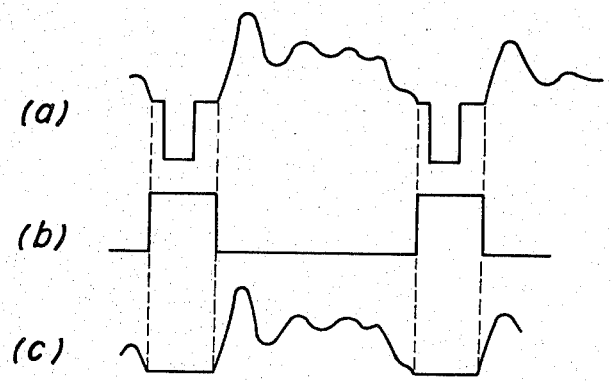
FIGS. 4 to 9 are waveforms for explaining the operation of the device according to the present invention.

FIG. 1 shows a fundamental construction of a picture recording and reproducing device. In FIG. 1, when an input video signal is supplied to an input line 1, this video signal is supplied to an Hadamard converter 3 through an analog gate 2. The Hadamard converter 3 converts the video signal into converted signals on multichannels (8 channels in this embodiment). The analog gate 2 inhibits the horizontal synchronizing signal included in the input video signal to generate a waveform as shown in FIG. 4. FIG. 4a is a waveform of an input video signal, FIG. 4b is a waveform of a gate pulse, and FIG. 4c is an output waveform of the analog gate 2.

The converted signals of each channel, as Hadamard converted, are supplied to mixers 41–48.

Figure 5:
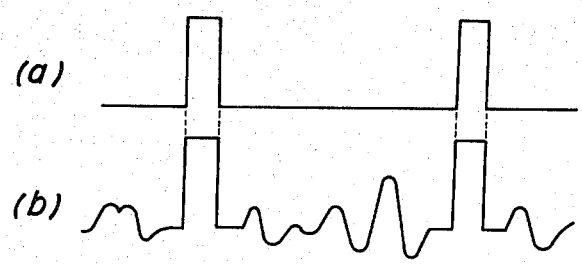

The input video signal is also supplied to a synchronized separator 5 to separate the horizontal synchronizing signal included in the video signal. The separated horizontal synchronizing signal is supplied to the mixers 41–48 as a mixed input signal thereby mixing it with the converted signal of each channel as a time base correction synchronizing signal. The synchronizing signal mixed into the mixers 41–48 acts a signal for detecting the jitter or drift component for the time base correction when reproducing. This state is shown in FIG. 5. That is, FIG. 5a shows an output waveform of the synchronizing separator 5, and FIG. 5b shows a waveform of the converted signal mixed into the synchronizing signal.

The output of the mixers 41–48 is supplied to frequency modulators 61–68 as a modulated input signal and FM modulated therein. These FM carrier waves are supplied to recording and reproducing heads 81–88 through changeover switches 71–78 at the recording side, and are recorded on a magnetic tape (not shown).

When reproducing, the reproduced outputs of each recording and reproducing head 81–88 are supplied to demodulators 91–98 through change-over switches 71–78 at the reproducing side to demodulate the converted signals of each channel. The demodulated converted signals are supplied to time base correctors 101–108 to correct and absorb time base fluctuation.

In this case, reference signals for the time base correction of the time base correctors 101–108 are received from a flywheel oscillator 11. This flywheel oscillator 11 is triggered by a synchronizing signal from a synchronizing signal separator 12. This synchronizing signal is derived from the output of the demodulator 92 within the second channel in this embodiment. The flywheel oscillator 11 does not follow to a high frequency in the jitter or drift component by a flywheel effect, and its oscillating frequency follows to the frequency within such a range that no flare is observed in the screen even if a jitter or drift is supplied to the input video signal of a television receiver.

Figure 6:
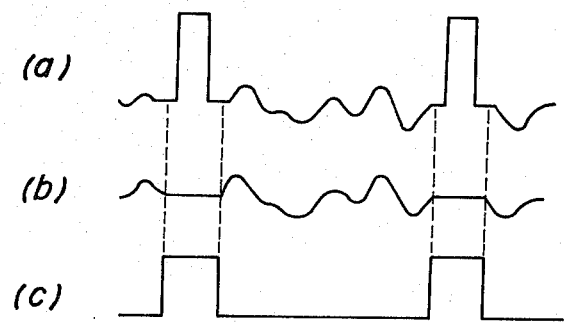

Each output of the time base correctors 101–108 is supplied to analog gates 131–138, so as to inhibit an unnecessary synchronizing signal. In this case, each of the analog gates 131–138 receives a gate pulse from a gate pulse generator 14 energized by the output of the flywheel oscillator 11. This state is shown in FIG. 6. FIG. 6a shows an output waveform of the time base correctors 101–108, FIG. 6b shows an output waveform of the analog gates 131–138 for inhibit analog gating the synchronizing signal, and FIG. 6c shows a gate pulse.

Figure 7:
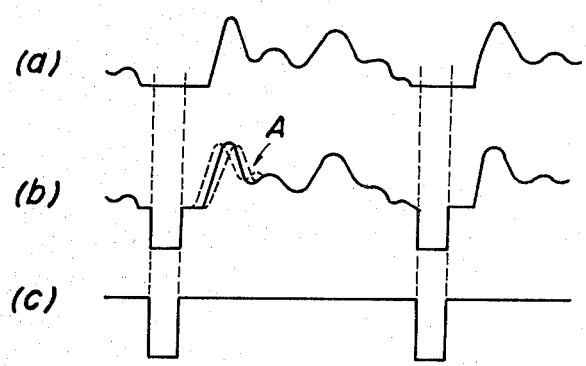

Each output of the analog gates 131–138 is supplied to the Hadamard reverse-converter 15 to reproduce the original video signal. The thus reproduced video signal is supplied to a synchronizing signal addition circuit 16. This synchronizing signal addition circuit 16 adds a horizontal synchronizing signal to a reproduced video signal by adding a synchronizing signal from a synchronizing signal generator 17 to the reproduced video signal. This state is shown in FIG. 7. FIG. 7a shows a waveform of a reproduced video signal from the Hadamard reverse-convertor 15, FIG. 7b shows a final waveform of an output video signal in which the horizontal synchronizing signal is added, and FIG. 7c shows a waveform of a horizontal synchronizing signal to be added.

The output video signal in which the horizontal synchronizing signal is added through a synchronizing signal addition circuit 16 is supplied to an output line 18.

However, in the above recording and reproducing device as disclosed, if residual jitter is present under this state, it causes jitter or drift in the video signal output between the horizontal synchronizing signal and the video signal, and as shown by point A in FIG. 7b, the video signal is only subjected to phase fluctuation against the horizontal synchronizing signal. It means, in principle of television receivers, flare is caused on the screen.

Figure 2:
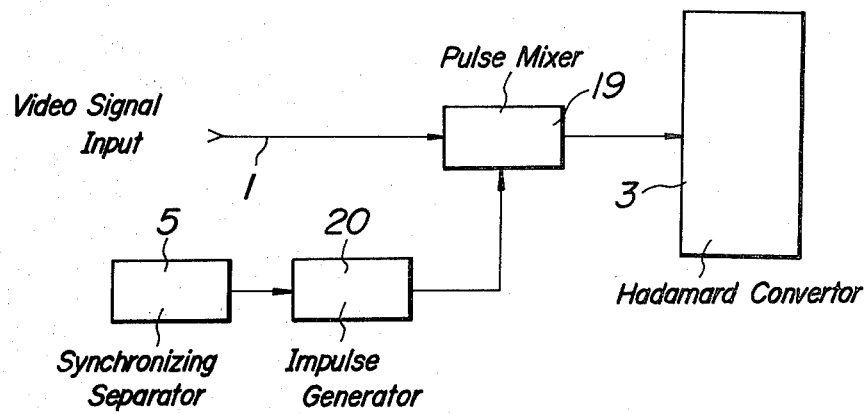
Figure 3:
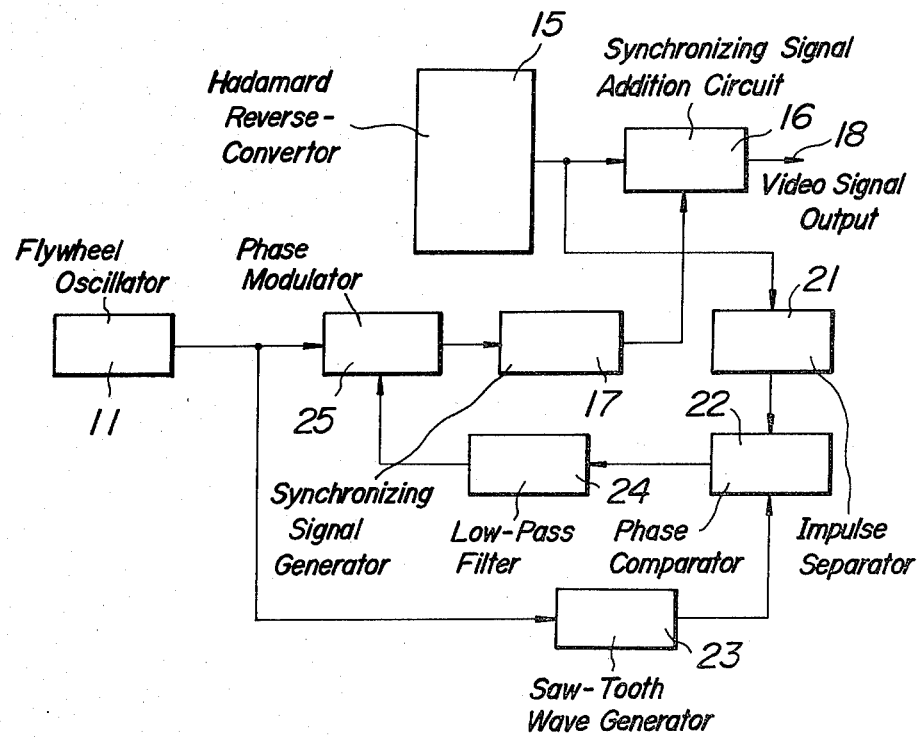

According to the present invention circuits shown in FIGS. 2 and 3 are added to the fundamental construction shown in FIG. 1. That is, FIGS. 2 and 3 show such construction that the synchronizing signal is also allowed to follow the phase fluctuation of a video signal so as to phase-modulate in the same manner, thereby substantially eliminating the phase difference between both signals and further eliminating any flare on the screen.

In the first place, at the recording side, i.e., the input side of the Hadamard converter 3, as shown in FIG. 2, the input video signal is supplied to the Hadamard converter 3 through a pulse mixer 19. This pulse mixer 19 receives an impulse-like output of an impulse generator 20, so that the impulse output is inserted in the vicinity of the back porch phase of the input video signal, that is, the portion which cannot be observed with the naked eye on the screen of a television receiver. In this case, the impulse generator 20 is triggered by an output of the synchronizing separator 5 mentioned above.

Figure 8:
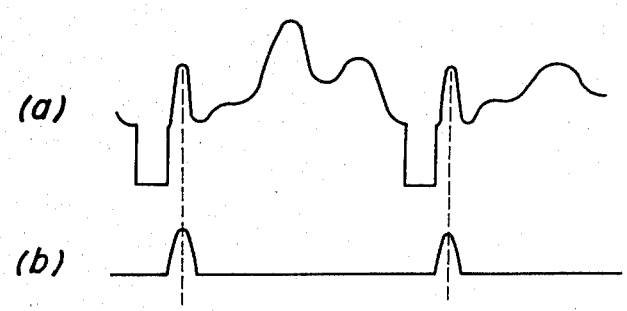

This state is shown in FIG. 8. FIG. 8a shows an output waveform of the pulse mixer 19, and FIG. 8b shows an output waveform of the impulse generator 20.

An impulse signal mixed into the input video signal becomes a certain signal which can be detected, regardless of the video signal, for detecting phase fluctuation of the video signal.

Figure 9:
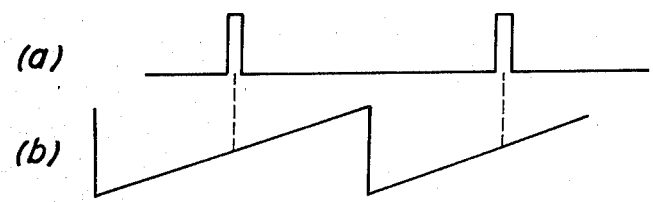

Moreover, at the reproducing side, that is, the output side of the Hadamard reverse-converter 15, as shown in FIG. 3, the above-described impulse signal mixed in to the video signal supplied from the Hadamard reverse-converter 15 is separated by an impulse separator 21. The separated impulse signal is supplied to a phase comparator 22 as one input. On the other hand, a sawtooth wave generator 23 is triggered by an output of the flywheel oscillator 11, and a sawtooth wave signal generated therein is supplied to the phase comparator 22 as another input. This state is shown in FIG. 9. FIG. 9a shows a sawtooth waveform of the impulse separated by the impulse separator 21 and FIG. 9b shows a sawtooth waveform.

Therefore, the phase comparator 22 generates a phase difference signal in proportion to the phases of an output signal of the flywheel oscillator 11 and the impulse signal, and the phase difference is supplied to a phase modulator 25 through a low pass filter 24. Then, the phase of the output signal from the phase modulator 25 is modulated, but in this case, the sensitivity of the phase comparator 22 and that of the phase modulator 25 are equal to each other, and it is also possible to make the phase fluctuation of the phase modulator 25 equal to that of the impulse by determining the polarity of the system properly.

Accordingly, the phase modulator 25 is triggered by the output of the flywheel oscillator 11, and the synchronizing signal generator 17 is triggered by the output of the phase modulator 25, so that at an operating bias point of the phase modulator 25 the horizontal synchronizing signal is added to the reproduced video signal by the Hadamard reverse-converter 15 at a normal position obtained by the synchronizing signal generator 17. In this case, the synchronizing signal added to the video signal shows the same movement as the phase fluctuation of the impulse signal, so that there is generated no phase fluctuation between the synchronizing signal and the video signal. Therefore, even if residual jitter remains in the time base corrector, any flare on the screen caused by the residual jitter can be prevented and the picture quality can remarkably be improved. The above described low pass filter 24 serves to prevent transient response to the phase modulator 25 in case of the lack of any impulse by dropout or the like, and even when generation of moire due to FM modulation generates jitter in the impulse itself, a jitter component caused by this moire can also be removed by the filter 24, since the jitter component caused by the moire is higher than the frequency of the jitter component caused by tape running.

The present invention is not limited to the above embodiment, but can be modified without departing from its scope.

As described above, according to the present invention, even if the residual jitter is present, a flare on the reproduced screen can be prevented, and the picture quality can be improved.

What is claimed is:

1. A device for recording and reproducing a video signal, comprising means for converting an incoming video signal into a plurality of signal channels, a plurality of magnetic heads for recording and reproducing said signal channels in association with a magnetic tape, first means for superimposing a pulse-like signal in the vicinity of the back porch of the incoming video signal, means for reconverting the plurality of signal channels to provide a reproduced video signal, second means for separating the superimposed pulse-like signal from the reproduced video signal, generator means for providing a horizontal synchronizing signal to be added to the reproduced video signal, third means for detecting relative phase fluctuation between the separated pulse-like signal and the horizontal synchronizing signal, and fourth means for controlling the phase of said horizontal synchronizing signal by the output of said third means and adding the horizontal synchronizing signal to said reproduced video signal.

2. A picture recording and reproducing device as claimed in claim 1, comprising a low pass filter for supplying the phase fluctuation output of said third means to said fourth means.

* * * * *